(12) United States Patent
Crumm et al.

(10) Patent No.: US 7,718,113 B2
(45) Date of Patent: May 18, 2010

(54) GAS DELIVERY SUBSTRATE

(75) Inventors: Aaron T. Crumm, Ann Arbor, MI (US); Christopher J. Reilly, Ann Arbor, MI (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 12/221,361

(22) Filed: Aug. 1, 2008

(65) Prior Publication Data

US 2008/0290565 A1 Nov. 27, 2008

Related U.S. Application Data

(62) Division of application No. 10/976,455, filed on Oct. 29, 2004, now Pat. No. 7,550,221.

(60) Provisional application No. 60/515,365, filed on Oct. 29, 2003.

(51) Int. Cl.
*C04B 35/64* (2006.01)

(52) U.S. Cl. .................. 264/629; 264/177.12; 264/614; 264/631

(58) Field of Classification Search ................ 264/629, 264/614, 631, 177.12
See application file for complete search history.

(56) References Cited

U.S. PATENT DOCUMENTS

| | | | | |
|---|---|---|---|---|
| 3,768,288 A * | 10/1973 | Jury | ................................ | 72/61 |
| 4,283,210 A * | 8/1981 | Mochida et al. | ................ | 55/523 |
| 4,430,391 A | 2/1984 | Ovshinsky et al. | | |
| 4,661,423 A | 4/1987 | Ueno et al. | | |
| 4,670,361 A | 6/1987 | Tsutsumi et al. | | |
| 5,034,023 A * | 7/1991 | Thompson | ................... | 205/634 |
| 5,041,248 A * | 8/1991 | Renlund et al. | ................ | 264/44 |
| 5,062,911 A * | 11/1991 | Hampton et al. | ......... | 156/89.14 |
| 5,147,722 A * | 9/1992 | Koslow | ....................... | 428/402 |
| 5,213,910 A | 5/1993 | Yamada | | |
| 5,227,102 A | 7/1993 | Yamada | | |
| 5,587,251 A * | 12/1996 | Spaeh et al. | ................... | 429/33 |
| 5,595,833 A * | 1/1997 | Gardner et al. | ................ | 429/19 |
| 5,643,690 A | 7/1997 | Tateishi | | |
| 5,645,781 A * | 7/1997 | Popovic' et al. | ............ | 264/639 |
| 5,770,327 A | 6/1998 | Barnett et al. | | |
| 5,922,155 A * | 7/1999 | Clouet et al. | ................... | 156/51 |
| 5,945,231 A | 8/1999 | Narayanan et al. | | |
| 6,174,473 B1 * | 1/2001 | Levy et al. | ................... | 264/127 |
| 6,391,486 B1 | 5/2002 | Narayanan et al. | | |
| 6,508,925 B2 * | 1/2003 | Long | ........................... | 205/117 |
| 6,528,214 B1 * | 3/2003 | Pliner et al. | ................. | 429/247 |

(Continued)

OTHER PUBLICATIONS

F.J. Gardner, et al.; Journal of Power Sources 86 (2000) pp. 122-129.

*Primary Examiner*—Joseph S Del Sole
*Assistant Examiner*—Kimberly A Stewart
(74) *Attorney, Agent, or Firm*—Krieg DeVault LLP; Matthew D. Fair

(57) ABSTRACT

A gas delivery substrate and method of manufacture is disclosed. A thermoplastic extrusion compound is created comprising a ceramic material and a thermoplastic resin, a green body is formed by thermoplastic extrusion of the compound, and the green body is sintered to form the gas delivery substrate. Such gas delivery substrates may be thin walled, highly porous and have secondary operations such as crimping and machining done prior to sintering.

24 Claims, 5 Drawing Sheets

U.S. PATENT DOCUMENTS

| | | |
|---|---|---|
| 6,531,240 B1 | 3/2003 | Brown et al. |
| 6,749,799 B2 | 6/2004 | Crumm et al. |
| 6,783,880 B2 * | 8/2004 | Christiansen ................ 429/33 |
| 2002/0039964 A1 * | 4/2002 | Tanaka et al. ................ 502/304 |
| 2003/0146538 A1 * | 8/2003 | Sambrook et al. ........... 264/211 |
| 2004/0076867 A1 | 4/2004 | Day et al. |

* cited by examiner

GAS DELIVERY SUBSTRATE

RELATED APPLICATION

The present application is a divisional of U.S. patent application Ser. No. 10/976,455, filed Oct. 29, 2004 now U.S. Pat. No. 7,550,221, which claims the benefit of U.S. Provisional Patent Application No. 60/515,365, filed Oct. 29, 2003, each of which are incorporated herein by reference.

FIELD OF THE INVENTION

This invention relates to gas delivery substrates and more particularly, to gas delivery substrates for use with fuel cells.

BACKGROUND OF THE INVENTION

Gas delivery substrates ("GDS") are used with delivery of gas fuel to a fuel cell. The GDS acts as a substrate onto which fuel cell components (anode, electrolyte, and cathode) films are deposited. GDS are typically formed from a ceramic material and are shaped in the form of a flat tile containing internal channels and microporous walls. The purpose of the channels is to deliver gaseous fuel to the surface of the substrate. The fuel gases permeate through the GDS to its surface, providing fuel to the anode of the fuel cell.

Known GDS are manufactured by conventional hydroplastic ceramic extrusion of oxides such as magnesium oxide doped magnesium aluminate (MMA). In this process, a ceramic powder is mixed with water based organic matrix to form a mud or dough-like material, and then extruded into a part with a desired shape. Once extruded, the mud must be dried (i.e., the water has to be removed), a slow step in the manufacturing process. Also, the dried part is relatively fragile, so secondary operations on the part are not practical. Further, the relative fragility requires that any walls made in the extruded shape are limited to a relatively large thickness. GDS made by this process are ceramic refractories that are rather large, heavy, and thick walled. It would be highly desirable to make GDS more compact and of lighter weight. Provision for sealing around the edges of a GDS should also be made easier.

SUMMARY OF THE INVENTION

In accordance with a first aspect, a method of making a gas delivery substrate comprises creating a thermoplastic extrusion compound comprising a ceramic material and a thermoplastic resin, forming a green body by thermoplastic extrusion of the compound forming internal channels to receive a fuel gas, and sintering the green body to form the gas delivery substrate. Manufacture of the gas delivery substrate in this manner allows the channel edges to be crimped so that the internal channel is closed.

Figure 1:
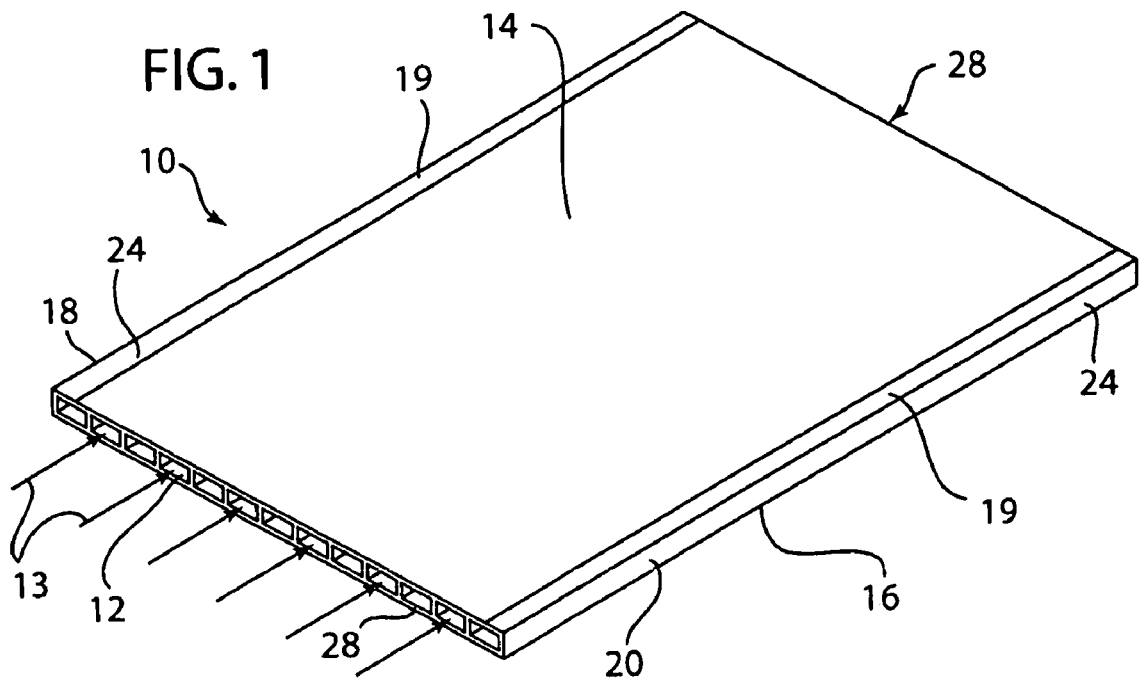
FIG. 1 shows a gas delivery substrate in accordance with a preferred embodiment where the substrate is shown as a flat plate with rectangular passages.

It should be understood that the appended drawings are not necessarily to scale, presenting a somewhat simplified representation of various preferred features illustrative of the basic principles of the invention. The specific design features of the gas delivery substrate as disclosed here, including, for example, specific dimensions of the passages will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the solid state electrochemical device illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the gas delivery substrates disclosed herein. The following detailed discussion of various alternative and preferred features and embodiments will illustrate the general principles of the invention with reference to a gas delivery substrate suitable for use with a solid oxide fuel cell ("SOFC"). Other embodiments suitable for other applications will be apparent to those skilled in the art given the benefit of this disclosure.

Referring now to the drawings, FIG. 1 shows an improved gas delivery substrate (GDS or merely "substrate") 10 having a main body shown here as a flat plate having a top wall 14, a bottom wall 16, side walls 18, 20, and internal channels or passages 12. The passages 12 are continuous along the direction of extrusion, and are open from front to back at first and second channel edges 28 (as seen in FIG. 1). The GDS preferably comprises a material porous to gas. Fuel gas 13 for a fuel cell is pumped through the channels 12 and diffuses through the walls of the substrate. The top and bottom walls are preferably sufficiently smooth and flat to serve as a substrate onto which is deposited, for example, the anode of a solid oxide fuel cell (SOFC). The walls 14, 16 of the plate have sufficient porosity to permit the fuel gas to permeate through to the large anode area and generate electrical power.

In accordance with a highly advantageous feature, the gas delivery substrate 10 may be made by thermoplastic extrusion, where one or more thermoplastic resins are mixed with a ceramic to form a plastic-like extrusion compound. Immediately after extrusion, the shaped extrudate cools and becomes rigid, forming a thermoplastic green body. The extrusion compound is prepared by blending the ceramic powder with a molten polymer resin in an amount sufficient to saturate the spaces between the ceramic particles and provide fluid properties for the extrusion compound when heated. Typically the molten polymer resin concentration preferably should be at least 25% by volume to provide the necessary fluid properties of the heated extrusion compound. The exact weight percentage of the polymer resin will depend in part upon the density of the ceramic. The rigidity or stiffness of the thermoplastic green body can be controlled by use of choice of resin, addition of additives which can act as solvents and by addition of plasticizers.

Figure 2:
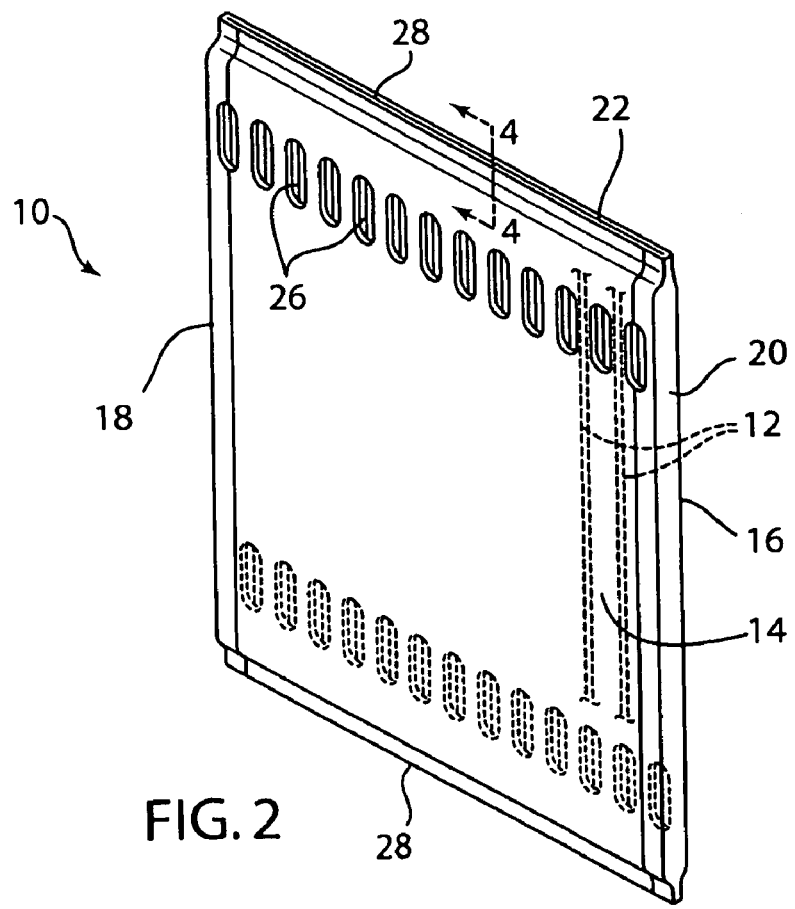
FIG. 2 is a top side view of a gas delivery substrate in accordance with another preferred embodiment having crimped edges and apertures for passage of gas.
Figure 3:
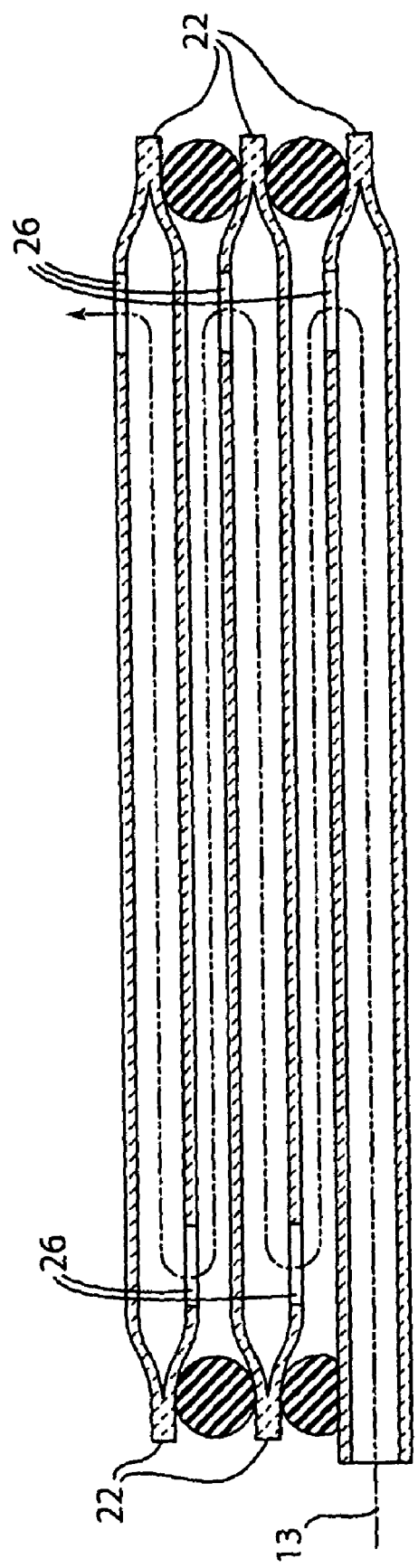
FIG. 3 shows a stack of gas delivery substrates and a serpentine fuel gas pathway.

The GDS is fabricated by forcing the heated thermoplastic mixture through a die of appropriate shape. The GDS can be changed in shape after extrusion, while formed as a green body, by crimping to collapse and seal the passages. Advantageously, manufacture of the green body using the thermoplastic extrusion may also be readily modified by green machining of slots and holes, bending, twisting, forming, notching, etc. Water is not used and cannot be used; given the relatively high temperatures required to produce a molten thermoplastic, any water evaporates from the green body. Since water is not used, the step of removing the water from the precursor compound is not required. Moreover, making a GDS by thermoplastic extrusion (instead of hydroplastic extrusion) advantageously allows for thinner cross section walls (for example, thinner than 3 mm), and secondary operations such as plastic forming, crimping to form a seal (instead of attaching the GDS to another, gas impermeable part), post-extrusion thermoplastic processing, machining and bending of the green body prior to sintering. For example, thermoplastic extrusion of a GDS allows for crimping 22 of edges 28, as seen in FIGS. 2-3.

A compound suitable for use as a green body for thermoplastic extrusion may be prepared essentially as described for the electrolyte in U.S. Pat. No. 6,749,799 to Crumm et al, entitled METHOD FOR PREPARATION OF SOLID STATE ELECTROCHEMICAL DEVICE. The thermoplastic ceramic extrusion compound is prepared from 85.9 weight percent of 8 mole % yttria stabilized zirconia powder, 7.2 weight percent of polyethylene polymer, 5.3 weight percent of acrylate polymer, 1.0 weight percent of stearic acid, and 0.3 weight percent of heavy mineral oil, 0.3 weight percent of polyethylene glycol of a molecular weight of 1000 grams per mole. Construction of a GDS from porous yttria stabilized zirconia (YSZ), can offer identical thermal expansion to match a YSZ electrolyte often used in a SOFC. The exact porosity of the substrate can be controlled in several ways, including through the sintering temperature, particle size distribution of the ceramic powder and by the use of pore-forming additives, such as carbon particles or similar pore-formers.

In addition to yttria stabilized zirconia, a GDS may also be fabricated from other metal oxides such as magnesia aluminate (MMA) with a similar process as described above, substituting ceramic powder of MMA for YSZ. Moreover, a GDS may be made from an active component which is electrically conductive. An anodic GDS may be fabricated from nickel-YSZ cermets, with yttria stabilized zirconia (Ni-YSZ) or other conductive materials. An inverse of the GDS, with an oxidant rather than fuel gas in the channels, could be fabricated from a cathode material. The cathode material can comprise, for example, lanthanum strontium manganate (LSM) or lanthanum strontium cobalite ferrite or other conductive material stable under oxidizing conditions. In addition, a GDS may be fabricated using materials suitable for use as catalysts for fuel reforming and interconnect materials. Catalysts are used to reform fuel gases, and can comprise, for example, ceramics such as alumina, zirconia, ceria, etc. Interconnect materials are used to connect the cathode of one fuel cell to the anode of another fuel cell, and can comprise, for example, strontium doped lanthanum chromium oxide (LaCrO$_3$). Any of these materials may be used in a thermoplastic extrusion process to make a gas delivery substrate. Other materials suitable for use as a GDS will be readily apparent to those skilled in the art, given the benefit of this disclosure.

Figure 4:
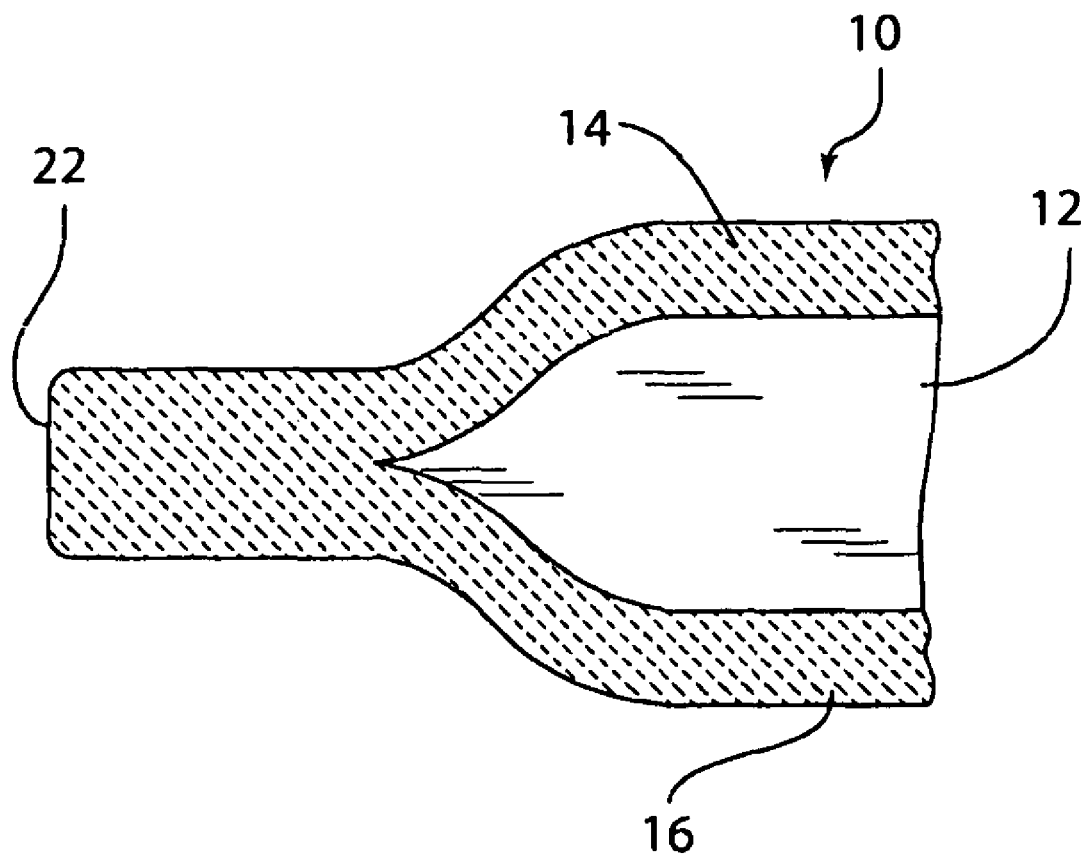
FIG. 4 is a cross section through line 4-4 in FIG. 2 showing a crimped edge of the gas delivery substrate of FIG. 2.

In accordance with a highly advantageous feature, the thermoplastic green body may be reheated (prior to sintering) and returned to a more fluid state, where it is easier to perform secondary operations. Warm thermoplastic surfaces of green bodies made as disclosed herein will bind together. FIG. 4 shows a close-up of an example where a crimped edge 22 is formed, after the thermoplastic ceramic extrusion compound has been extruded to form a green body, but prior to sintering. Crimped edges 22 advantageously eliminate the need for attaching secondary components to close off the channels. Other secondary operations such as cutting and machining operations will be readily apparent to those skilled in the art given the benefit of this disclosure.

FIG. 2 shows an alternate geometry for the gas delivery substrate where the main body has been modified somewhat. Instead of attaching the GDS to another component at the ends, channel edges 28 are crimped 22 closed so that gas cannot pass. At least one wall is provided with at least one slot, and most preferably a plurality of slots 26, with each slot corresponding to a channel 12, although in certain preferred embodiments a slot may be connected to more than one channel. As shown in FIG. 2, a row of slots 26 are provided on one wall 14 and another row of slots are provided on another wall 16. FIG. 3 shows how this design can be used in stack of substrates. Gas flow 13 is made serpentine as indicated by the arrow, and the top two substrates are essentially identical to FIG. 2, allowing for an extended passageway for gas flow between substrates. The bottom substrate has slots 26 only on the top right side, as seen in FIG. 3.

Figure 5:
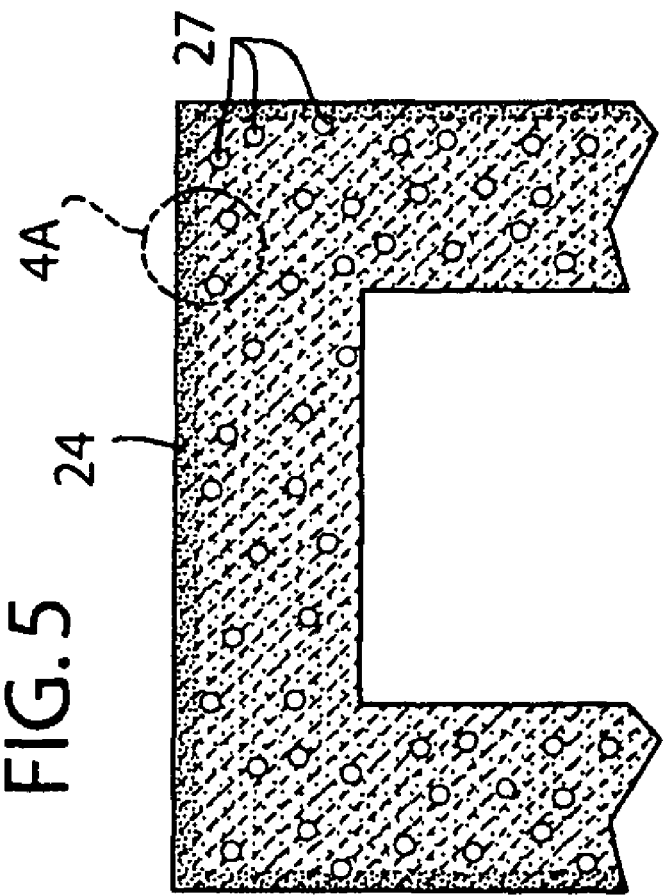
FIG. 5 is an isolated cross section view near one of the two side edges showing a dense seal which is generally impermeable to gas.
Figure 6:
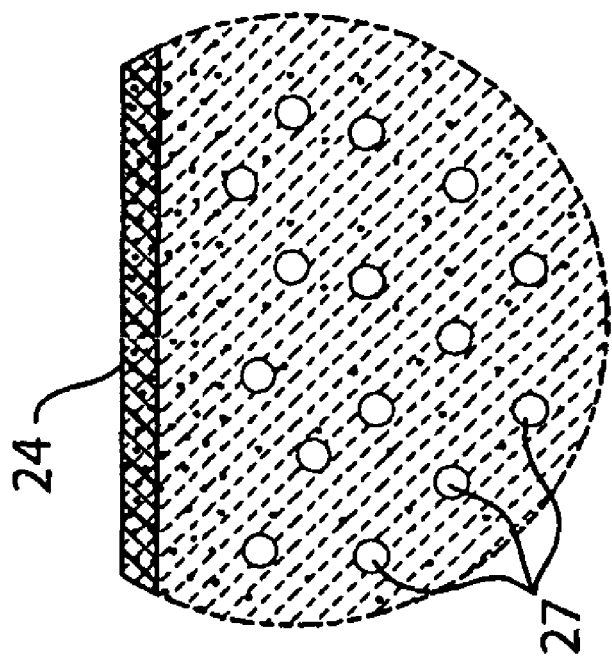
FIG. 6 is a close-up taken from FIG. 5, showing the transition between the gas impermeable material and the main body of the gas delivery substrate.

It is desirable that the permeation of the gas occur only through selected surfaces, and not on other surfaces. To control the flow of gas, preferably at least side edges 19 may be coated with a gas impermeable coating 24. The side edges include at least the side walls 18, 20, and can include some of the top and bottom walls, 14, 16, as shown in FIG. 1. It will be readily apparent to those skilled in the art that other portions of the GDS may be coated with a gas impermeable coating, as needed. FIGS. 5-6 show a close-up view of one of the walls of the GDS with a gas impermeable coating 24. The gas impermeable coating can comprise, for example, a suspension of fine particle yttria stabilized zirconia powder can be applied like paint to the surface of the green body before the high temperature sintering treatment, creating a thin dense layer. Fine particle size would include particles having a size of less than 2 microns, and more preferably 1 micron.

Preferably the main body comprises a pore 27 forming ceramic material having a particle size distribution range of about 0.1 micrometers to 200 micrometers.

Figure 7:
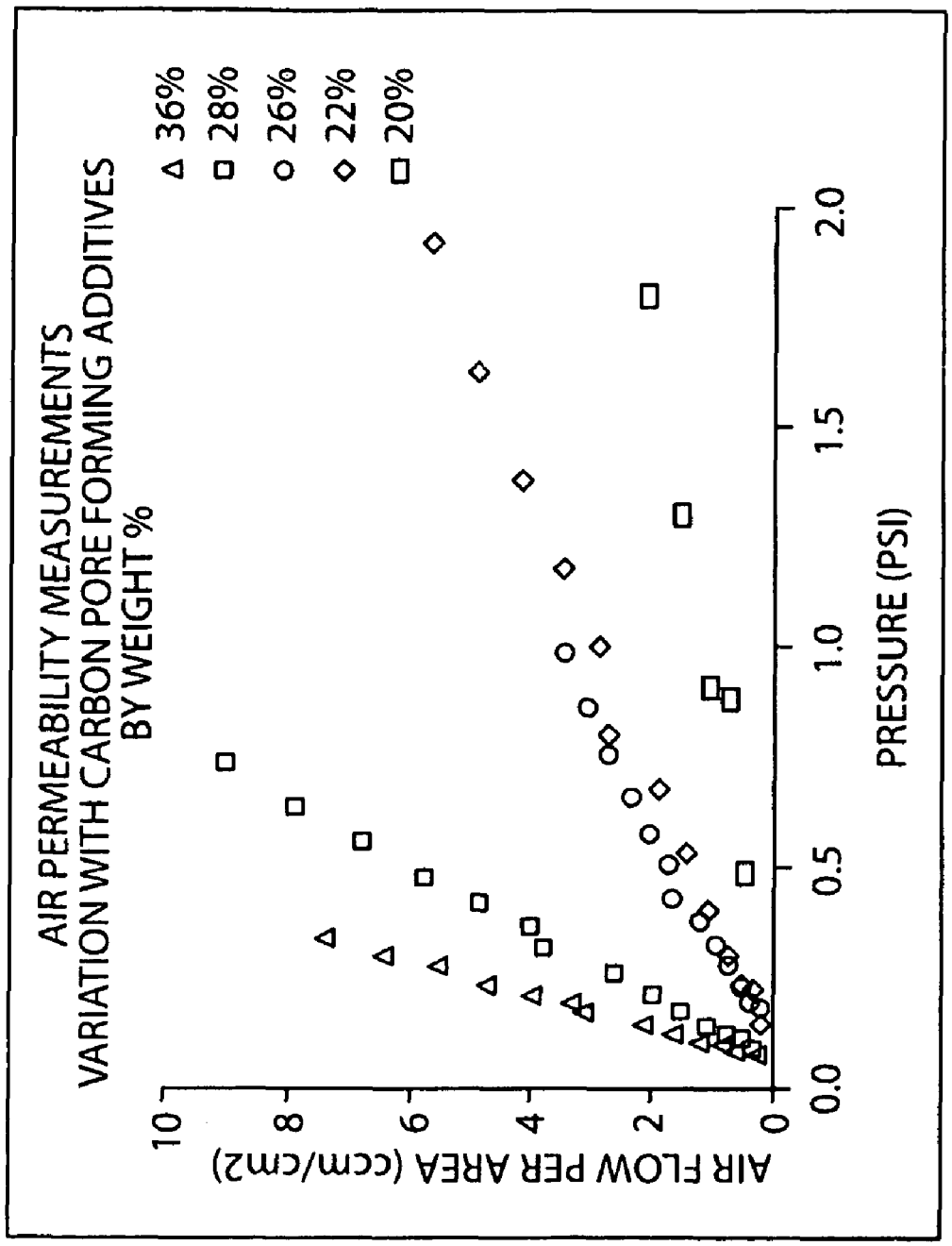
FIG. 7 shows variations in volume of gas flow with different pressures and different volume percentage amounts of pore-forming additives to the composition used to form the a gas delivery substrate.

The function of the GDS is to deliver fuel to the anode by permeation through the porous membrane. The permeability can be controlled by manipulating the pore volume fraction, pore channel size and tortuosity, as modeled by the Kozeny-Carmon Equation, or similar theoretical models for transport in porous solids. These equations predict the permeability as a function of pore size, pore volume, and tortuosity. These factors can be controlled by the use of pore-formers in the thermoplastic extrusion green body, such as carbon particles of controlled size and shape. FIG. 7 shows measurements of air flow in cubic centimeters per centimeter squared versus air pressure in psi for representative example GDS substrates fabricated from YSZ by thermoplastic ceramic extrusion, using carbon particles as pore-forming additives. Five different 7 additions of carbon pore formers, ranging from 20 volume percent to 36 volume percent are shown. The slope of these graphs is proportional to the gas phase permeability.

Note that the slope is relatively shallow for a low permeability for addition of 20 volume percent pore forming additive, while 36 volume percent pore forming additives have a steeper slope with a higher permeability. These examples illustrate the modification of permeability by the addition of pore formers. Similar modifications in pore size, pore volume, and tortuosity can be achieved by control of the particle size distribution of the ceramic materials used to create the green body. For example, pore forming ceramic material having a particle size distribution range of about 5 micrometers to 200 micrometers creates pores 27 of suitable size for proper diffusion of fuel gas.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of making a gas delivery substrate comprising in combination, the steps of:
   creating a thermoplastic extrusion compound comprising a ceramic material and a thermoplastic resin;
   forming a green body by thermoplastic extrusion of the compound, the green body having a top wall, a bottom wall, side walls and a series of internal channels running parallel to one another and ending at first and second channel edges; and
   sintering the green body to form the gas delivery substrate.

2. The method of claim 1 wherein the gas delivery substrate has internal channels, side edges and channel edges, and further comprising the step of crimping at least one of the channel edges to close the internal channels.

3. The method of claim 1 wherein the step of crimping occurs prior to the step of sintering.

4. The method of claim 1 further comprising the step of applying a gas impermeable coating at the side edges.

5. The method of claim 1 wherein the ceramic material comprises one of magnesium oxide aluminum oxide, and a stabilized zirconia.

6. The method of claim 1 further comprising a pore forming material having a particle size distribution range of about 0.1 micrometers to 200 micrometers.

7. The method of claim 1 wherein the thermoplastic extrusion compound contains at least 25% percent by volume thermoplastic resin.

8. The method of claim 1 wherein the step of forming the green body further comprises heating the extrusion compound prior to extrusion, and allowing the extrusion compound to cool after extrusion.

9. The method of claim 8 wherein the green body is reheated prior to sintering.

10. The method of claim 2, further comprising heating the green body prior to the crimping.

11. The method of claim 1, further comprising a step for closing at least one of the internal channels prior to sintering.

12. A method of making a device configured to deliver a gas for use in a fuel cell, comprising:
    a step for creating a thermoplastic compound having a ceramic material and a thermoplastic resin;
    a step for forming the thermoplastic compound by thermoplastic extrusion into a green body having a structure configured as a gas delivery substrate for use in the fuel cell, the green body including an internal channel; and
    a step for sintering the green body.

13. The method of claim 12, further comprising a step for mechanically closing an end of the internal channel prior to sintering.

14. The method of claim 13, further comprising a step for heating the green body prior to the step for mechanically closing the end of the internal channel.

15. The method of claim 13, wherein the green body includes a first wall and a second wall, further comprising a step for binding together the first wall and the second wall prior to sintering.

16. The method of claim 12, wherein the thermoplastic compound includes a pore-forming material.

17. The method of claim 12, wherein the sintered green body is porous to at least one of a fuel and an oxidant employed in the fuel cell.

18. The method of claim 12, further comprising a step for depositing a gas impermeable coating on at least a portion of the gas delivery substrate.

19. The method of claim 12, wherein the thermoplastic compound includes a metal oxide.

20. The method of claim 19, wherein the metal oxide includes stabilized zirconia.

21. The method of claim 12, wherein the thermoplastic compound includes an electrically conductive material.

22. The method of claim 21, wherein the electrically conductive material is at least one of an anode material, a cathode material, an interconnect material and a catalyst material configured for use in said fuel cell.

23. The method of claim 12, wherein the thermoplastic compound is created without water.

24. The method of claim 12, wherein the step for creating the thermoplastic compound includes mixing the ceramic material with a molten thermoplastic resin.

* * * * *